United States Patent
Schwartz

(10) Patent No.: US 12,000,163 B1
(45) Date of Patent: Jun. 4, 2024

(54) POST SETTING SYSTEM

(71) Applicant: Merlie Schwartz, Brinkhaven, OH (US)

(72) Inventor: Merlie Schwartz, Brinkhaven, OH (US)

(*) Notice: Subject to any disclaimer, the term of this patent is extended or adjusted under 35 U.S.C. 154(b) by 0 days.

(21) Appl. No.: 18/357,687

(22) Filed: Jul. 24, 2023

(51) Int. Cl.
 E04G 21/18 (2006.01)
 A01B 51/02 (2006.01)
 A01B 76/00 (2006.01)
 A01B 79/00 (2006.01)
 E02D 7/06 (2006.01)
 E04H 12/22 (2006.01)
 E04H 12/34 (2006.01)
 E04H 17/26 (2006.01)

(52) U.S. Cl.
 CPC ........ E04G 21/1841 (2013.01); A01B 51/026 (2013.01); A01B 76/00 (2013.01); A01B 79/005 (2013.01); E02D 7/06 (2013.01); E04H 12/2284 (2013.01); E04H 12/347 (2013.01); E04H 17/263 (2013.01)

(58) Field of Classification Search
 CPC ... E04H 12/2284; E04H 12/347; E04H 12/22; E04H 12/00; E04H 12/34; E04H 17/263; E04H 17/261; E04H 17/26; E04H 17/00; E04G 21/1841; E04G 21/18; E04G 21/16; E04G 21/14; E04G 21/00; A01B 51/026; A01B 76/00; A01B 79/005; A01B 51/02; A01B 51/00; A01B 79/00; E02D 7/06; E02D 7/02; E02D 7/00
 See application file for complete search history.

(56) References Cited

U.S. PATENT DOCUMENTS

| 8,157,477 B2 | 4/2012 | Horan et al. |
| 8,752,876 B2 | 6/2014 | Niekamp et al. |
| 2010/0095559 A1 | 4/2010 | Buckner |
| 2017/0101804 A1* | 4/2017 | Coleman, Jr. ........... E04H 12/22 |

FOREIGN PATENT DOCUMENTS

| CN | 108131154 A | * | 6/2018 | ............. E21D 11/04 |
| KR | 1627905 B1 | * | 6/2016 | ............... G01C 9/00 |

* cited by examiner

Primary Examiner — Christopher J. Novosad
(74) Attorney, Agent, or Firm — Vorys, Sater, Seymour and Pease LLP; Rex W. Miller, II

(57) ABSTRACT

A post setting attachment for a utility vehicle includes a base having a first side mountable to the utility vehicle, the base having a second side opposing the first side of the base. The post setting attachment can include a column coupled to the second side of the base and have a length extending vertically. The post setting attachment can further include a pair of clamps attached at separate lengths along the column and configured to grasp a post. The post setting attachment can include a controller that rotates and translates the column to adjust a position of the post. Furthermore, the post setting attachment can include a gravel hopper coupled to the second side of the base that is controlled by the controller to discharge gravel after the controller adjusts the position of the post to secure the post in position.

21 Claims, 9 Drawing Sheets

POST SETTING SYSTEM

TECHNICAL FIELD

The present disclosure relates to systems and methods for aligning and setting a post.

BACKGROUND

Various systems and structures have been constructed with posts requires to be set in a particular configuration. For example, post-frame buildings have been constructed with wood posts. The posts are set according to a blueprint and must be aligned both vertically and relative to each adjacent post within tight tolerances. The construction for post-frame buildings has required significant manual effort of multiple people to place, align, and subsequently secure each post, while maintaining the necessary alignment with other posts for the building. There remains a need for automated post setting systems that enable precise positioning of posts and the ability to secure posts in the properly aligned position while reducing the manual effort required.

SUMMARY OF DISCLOSURE

One example relates to post setting attachment for a utility vehicle that can include a base having a first side mountable to the utility vehicle, the base having a second side opposing the first side of the base. The post setting attachment can further include a column with a length extending vertically and coupled to the second side of the base. The post setting attachment can also include a pair of clamps configured to grasp a post, the pair of clamps being attached at separate lengths along the column. The post setting attachment can further include a controller that rotates and translates the column to adjust a position of the post. Additionally, the post setting attachment can include a gravel hopper coupled to the second side of the base that is controlled by the controller, such that the gravel hopper discharges gravel after the controller adjusts the position of the post to secure the post in position.

Another example relates to a method for setting a post with an attachment for a utility vehicle. The method can include grasping a post via a pair of actuated clamps coupled to the attachment. The method can further include measuring an actual position of the post, including an actual triaxial position of the post and an actual geospatial position of the post, via a plurality of sensors. Moreover, the method can include comparing, via a controller, the actual position of the post with a desired position of the post stored by controller in response to receiving the measured actual position of the post from the plurality of sensors. The desired position of the post can include a desired geospatial position and a desired triaxial position. The method can further include adjusting, via an alignment system controlled by the controller, the actual geospatial position of the post to match the desired geospatial position of the post stored by the controller. Further, the method can include adjusting, via a leveling system controlled by the controller, the actual triaxial position of the post to match the desired triaxial position of the post stored by the controller. Additionally, the method can include discharging, via a gravel hopper controller by the controller, backfill material to secure the post in response to the controller determining that the actual position of the post matches the desired position of the post. Furthermore, the method can include releasing, via the actuated clamps, the post in response to the controller discharging the backfill material.

Still another example relates post setting attachment for a skid loader that includes a base having a first side mountable to arms of the skid loader, the base having a second side opposing the first side of the base. The post setting attachment can further include a platform rotatably coupled to the second side of the base and a column with a length extending vertically from the platform, the column being rotatably coupled to the platform. The post setting attachment can also include a pair of clamps configured to grasp a given post of a plurality of posts, the pair of clamps being attached at separate lengths along the column. Furthermore, post setting attachment can include a plurality of sensors coupled to the post setting attachment configured to measure an actual position of the given post. Additionally, the post setting attachment can include a controller that receives the actual position of the given post from the plurality of sensors and stores a desired position of the given post relative to the plurality of posts. The post setting attachment can also include an alignment system controlled by the controller to adjust the actual position of the given post to match the actual position of the given post with the desired position of the given post. Moreover, the post setting attachment can include a gravel hopper extending vertically from the platform and including a gravel hopper actuator that is controlled by the controller. The gravel hopper can discharge gravel in response to the controller determining the actual position of the given post matches the desired position of the given post

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
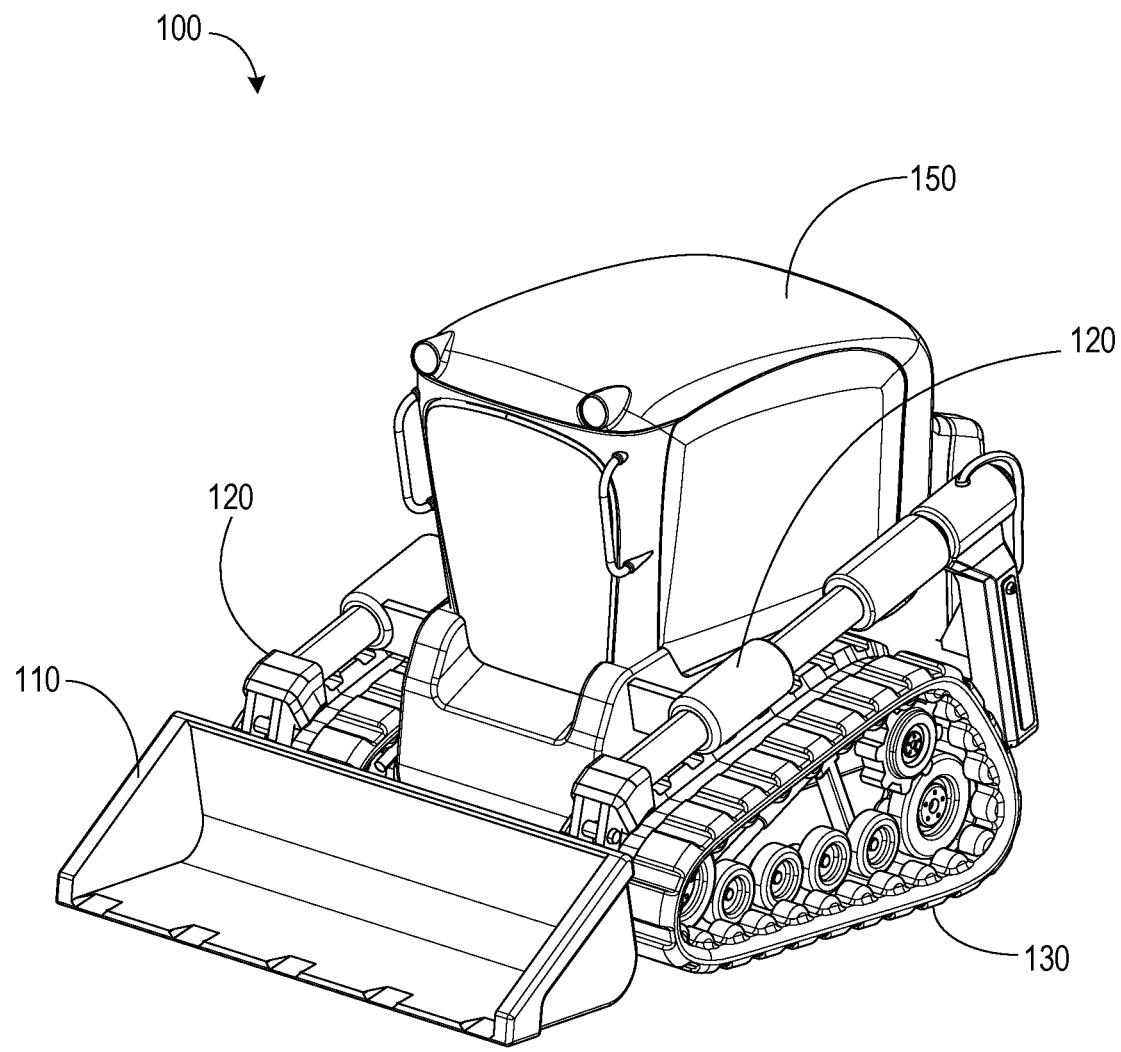
FIG. 1 illustrates an example skid loader.

The present disclosure is related to a post setting system, attachable to a skid loader or other heavy machinery. The post setting system enables one person to properly position and secure a post. Setting a post, such as post for a post-frame building, requires that the post is vertically plumb and aligned with other posts of the structure. Other systems, such as poles for telephone or utility lines, similarly require setting multiple posts positioned in relation to each other as part of the system. Conventionally, alignment and setting of a post in a plumb position can require a team of multiple people. For example, one person of the team can be responsible for digging a hole, a second person can be responsible for positioning the post, a third person can be responsible for holding the post, and a fourth person can be responsible for backfilling the hole. Moreover, each person of the team can be required to use a diverse set of tools to position and secure the post, including but not limited to a level, a post driver, a shovel, and compactor.

The post setting system of the present disclosure removes the need for a team of people and a divided set of tools to set a post. The post setting attachment can include a set of components including clamps to grasp a post, a gravel hopper, and an alignment system, which may also include a leveling system. In an example, the clamps can be positioned on a column that is controllable with the leveling system. The leveling system can ensure that the post is vertical or plumb. The alignment system can ensure that the post is properly positioned according to a blueprint and other posts. The gravel hopper can scoop gravel and discharge gravel into a hole of the post. Because the post setting attachment includes the leveling system and alignment system, as well as the gravel hopper, the post setting attachment obviates the need for a multi-person team of people to set a post.

Particularly, the leveling system can rotate the post about an x, y, and z axis to ensure that the post is plumb. The alignment system can further translate the given post along the x, y, and z axis to ensure that the post is properly positioned in a hole or at a surface according to the blueprint and other posts. In response to the leveling system and alignment systems positioning the given post, a gravel hopper can discharge gravel into the hole to secure the given post.

Each component of the post setting attachment can be controlled by a controller. The controller can be positioned in a cabin of the skid loader attached to the post setting attachment and coupled (e.g., wirelessly) to the post setting attachment. Therefore, the controller can provide signals to the components of the post setting attachment to actuate (e.g., hydraulically) each of the clamps, gravel hopper, leveling system and alignment system of the post setting attachment. Accordingly, the controller can automatically control the post setting attachment to set a given post without the need for a team of people and/or a set of divided tools. Alternatively, a single person can interact with the controller to control the post setting attachment to set the given post.

FIG. 1 illustrates an example skid loader 100. The skid loader 100 can include a bucket 110 attachable to arms 120 of the skid loader 100. The arms 120 of the skid loader can further include actuators, such as hydraulic actuators, that raise, lower, retract, and/or extend the arms 120 of the skid loader 100. The skid loader 100 can further include tracks 130 configured to move the skid loader 100. In other examples, the skid loader 100 can include a set of wheels to move the skid loader 100 rather than the tracks 130. The skid loader 100 can further include a cabin 150. The cabin 150 of the skid loader can be an enclosure or housing that protects a user of the skid loader 100. The cabin 150 can further include controls, such as a controller, to operate the tracks 130 and arms 120 of the skid loader 100. Accordingly, the user can operate the arms 120 and tracks 130 of the skid loader 100 from the safety of the cabin 150.

Furthermore, the user can operate a bucket 110 attached to the arms 120 of the skid loader 100. In some examples, the bucket 110 can be employed to pick up and drop debris or materials in response to the bucket 110 and arms 120 receiving signals provided by controls of the cabin 150. The bucket 110 can also be an attachment, such that the arms 120 of the skid loader 100 are configured to receive a variety of attachments. The variety of attachments can include a backhoe, pallet forks, angle broom, sweeper, mower, and snow blower that are attachable to the arms 120 of the skid loader 100. In an example, the skid loader 100 can be a utility vehicle, such as another compact heavy machine capable of receiving an attachment, such as an excavator, tractor, or forklift.

Figure 2:
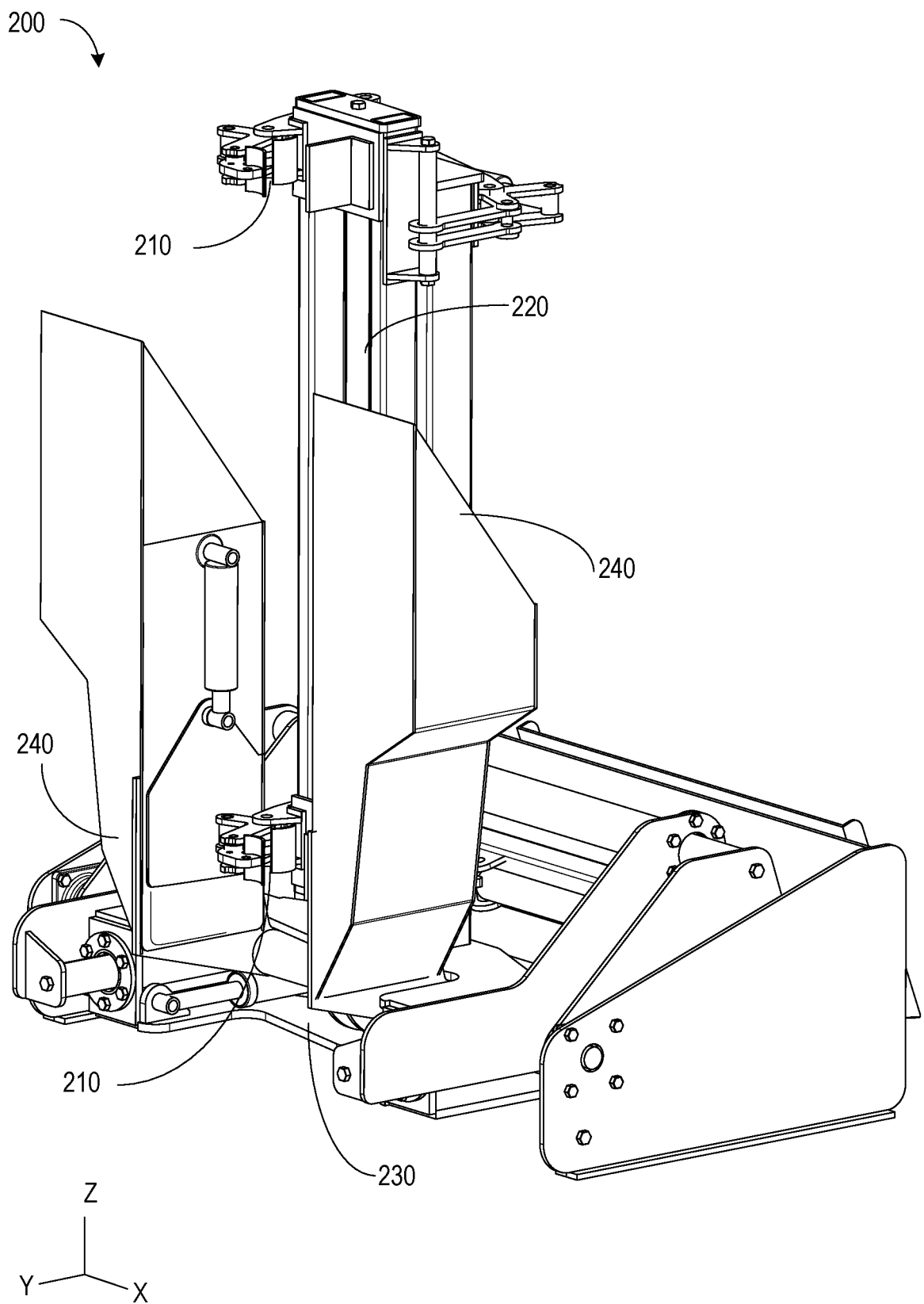
FIG. 2 a side view of an example post setting attachment.

FIG. 2 illustrates a side view of an example post setting attachment 200. The post setting attachment 200 can be attached to lift arms of a skid loader, such as skid loader 100 of FIG. 1. The post setting attachment 200 can include clamps 210 fixably attached to a column 220 of the post setting attachment 200. The column 220 can extend vertically (e.g., along a z-axis) from a platform 230 that is horizontal (e.g., parallel to an x-y plane). The clamps 210 can be a set of two clamps 210 distally positioned along the column 220. For example, the two clamps 210 can be separated by 1.82 meters along the column 220. In some examples, the clamps can be separated from 1 meter to 2 meters. In other examples, the clamps 210 can include a single clamp 210, or three or more clamps 210 positioned along the column 220. The clamps 210 can be actuated to close and grasp a post, as well as actuated to open and release a post. Furthermore, the position of the clamps 210 can be adjusted based on a length of post to be grasped by the clamps 210.

The post setting attachment 200 further includes gravel hoppers 240 that extend vertically from the platform 230. The gravel hoppers 240 can include a pair of gravel hoppers 240. In some examples, the gravel hoppers 240 can include a single gravel hopper 240 or three or more gravel hoppers 240. The gravel hoppers 240 can be employed to scoop gravel. Accordingly, the gravel hoppers 240 can be actuated to discharge gravel, or other contents held by the gravel hopper 240.

Figure 3:
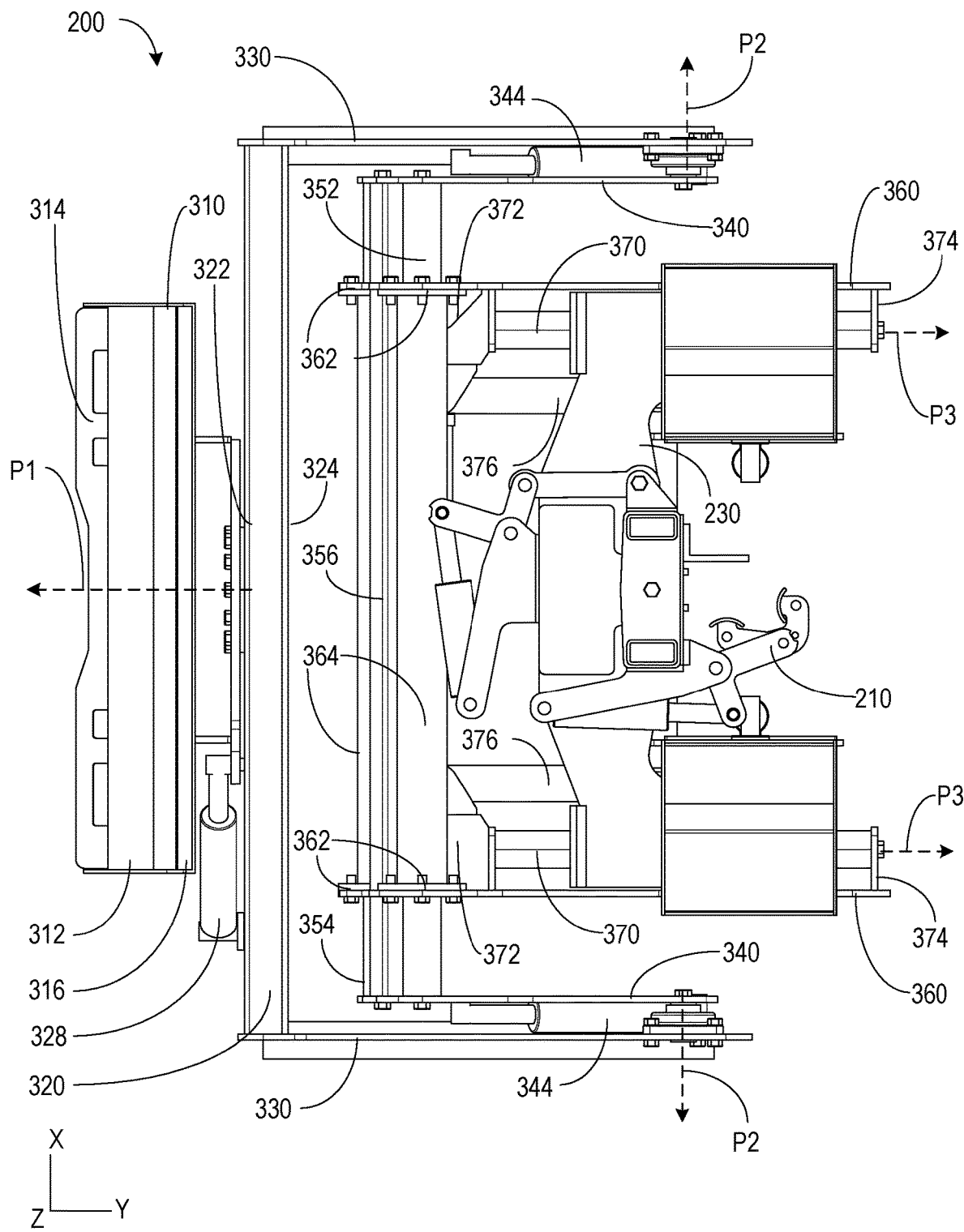
FIG. 3 is a top view of the example post setting attachment.

FIG. 3 illustrates a top view of the post setting attachment 200. The post setting attachment 200 can include a base 310. On a first side 312 of the base 310 can be a mounting plate 314. The mounting plate 314 can be attachable to arms of skid loader, such as the arms 120 of skid loader 100 in FIG. 1. On a second side 316 of the base 310 opposing the first side 312, the base 310 can be rotatably coupled to a support structure 320. The support structure 320 can extend a length parallel to the base 310 and include a first side 322 that is rotatably coupled to the second side 316 of the base 310, as well as a second side 324 that opposes the first side 322. Because the support structure 320 is rotatably coupled to the base 310, the support structure can rotate about a first axis P1 that extends perpendicular through the lengths of the support structure 320 and base 310. For example, a base actuator 328 can be coupled to the first side 322 of the support structure 320 and a second side 316 of the base 310, such that the base actuator 328 causes the support structure 320 to rotate about the first axis P1.

A pair of support flanges 330 can extend from the second side 324 of the support structure 320 at distal ends of the length of the support structure 320. The support flanges 330 can further be perpendicular to the length of the support structure 320. Accordingly, a proximal end of each support flange 330 can be fixably attached or integrated with the support structure 320. A distal end of each support flange 330 can rotatably coupled to a corresponding rotational flange 340. A rotational flange 340 can include a distal end that is coupled to the corresponding support flange 330. Moreover, the rotational flanges 340 can be positioned within the length of the support structure 320 and extend parallel to the corresponding support flanges 330. Accordingly, each rotational flange 340 can have a length that extends toward and perpendicular to the length of the support structure 320, the length of each rotational flange 340 having a length that is less than the length of the support flanges 330. Therefore, each rotational flange 340 can have a proximal end, or an end that is proximal to the length of the support structure 320.

Additionally, each rotational flange 340 can include a rotational actuator 344. Particularly, a first end of a given rotational actuator 344 can be coupled to a distal end of a support flange 330. A second end of the given rotational actuator 344 can be coupled to the proximal end of the corresponding rotational flange 340. Therefore, the rotational actuator 344 can cause the corresponding rotational flange 340 to rotate about a second axis P2 perpendicular to the support flange 330 and extending through the rotatable coupling between the support flange 330 and rotational flange 340.

A proximal end of each rotational flange 340, or the end opposing the distal end of the rotational flange 340 and proximal to the support structure 320, is configured to receive a first translational beam 352, a second translational beam 354, and a support beam 356. Therefore, each of the first translational beam 352, second translational beam 354, and support beam 356 extend between proximal ends of the rotational flanges 340. Respective distal ends of each of the first translational beam 352, second translational beam 354, and support beam 356 can be fixably attached to the corresponding rotational flange 340. In other examples, the first translational beam 352 and second translational beam 354 can be rotatably attached to the rotational flanges 340. Moreover, the support beam 356 can be placed between the first translational beam 352 and second translational beam 354.

The post setting attachment can further include platform flanges 360. Each of the platform flanges 360 can be translationally attached to the first translational beam 352 and second translational beam 354. Particularly, the first translational beam 352 and second translational beam 354 can extend through sockets 362 of the platform flanges 360. The platform flanges 360 can further extend perpendicular to lengths of the first translational beam 352 and second translational beam 354. Therefore, the lengths of the platform flanges 360 can extend parallel to the support flanges 330 and rotational flanges 340. Additionally, the platform flanges 360 can have a fixed distance between each other along the first translational beam 352 and second translational beam 354. To maintain the distance between the platform flanges 360, a pipe 364 can be bolted or welded to the sockets 362 of the platform flanges 360 and receive the corresponding translational beam. For example, the pipe 364 can be secured between the platform flanges 360 and encompass the first translational beam 352, while allowing translation of the first translational beam 352 through the pipe 364.

The platform flanges 360 can each include a platform beam 370. The platform beams 370 can be fixably attached to distal ends of the corresponding platform flange 360. Particularly, each platform flange 360 can include a first bracket 372 positioned at an end of the corresponding platform flange 360 proximal to the sockets 362 of the corresponding platform flange 360. A second bracket 374 can be positioned at an end of the platform flange 360 distal to the sockets 362 of the corresponding platform flange 360. Accordingly, a platform beam 370 can be secured to a corresponding platform flange 360 via the first bracket 372 and second bracket 374. That is, a length of the platform beam 370 can extend parallel to the corresponding platform flange 360 and between the first bracket 372 and second bracket 374. Moreover, each of the first bracket 372 and second bracket 374 can be positioned on the corresponding platform flange 360 to face the opposing platform flange 360.

The platform 230 can be translationally coupled to the platform beams 370. Additionally, each platform flange 360 further include a platform actuator 376. Particularly, a first bracket of a given platform flange 360 can be fixably attached to a first end of the corresponding platform actuator 376. A second end of the corresponding platform actuator 376 can be coupled to the platform 230. Accordingly, the platform actuator 376 can cause the platform 230 to translate along a third axis P3 defined by one or both of the platform beams 370.

Figure 4:
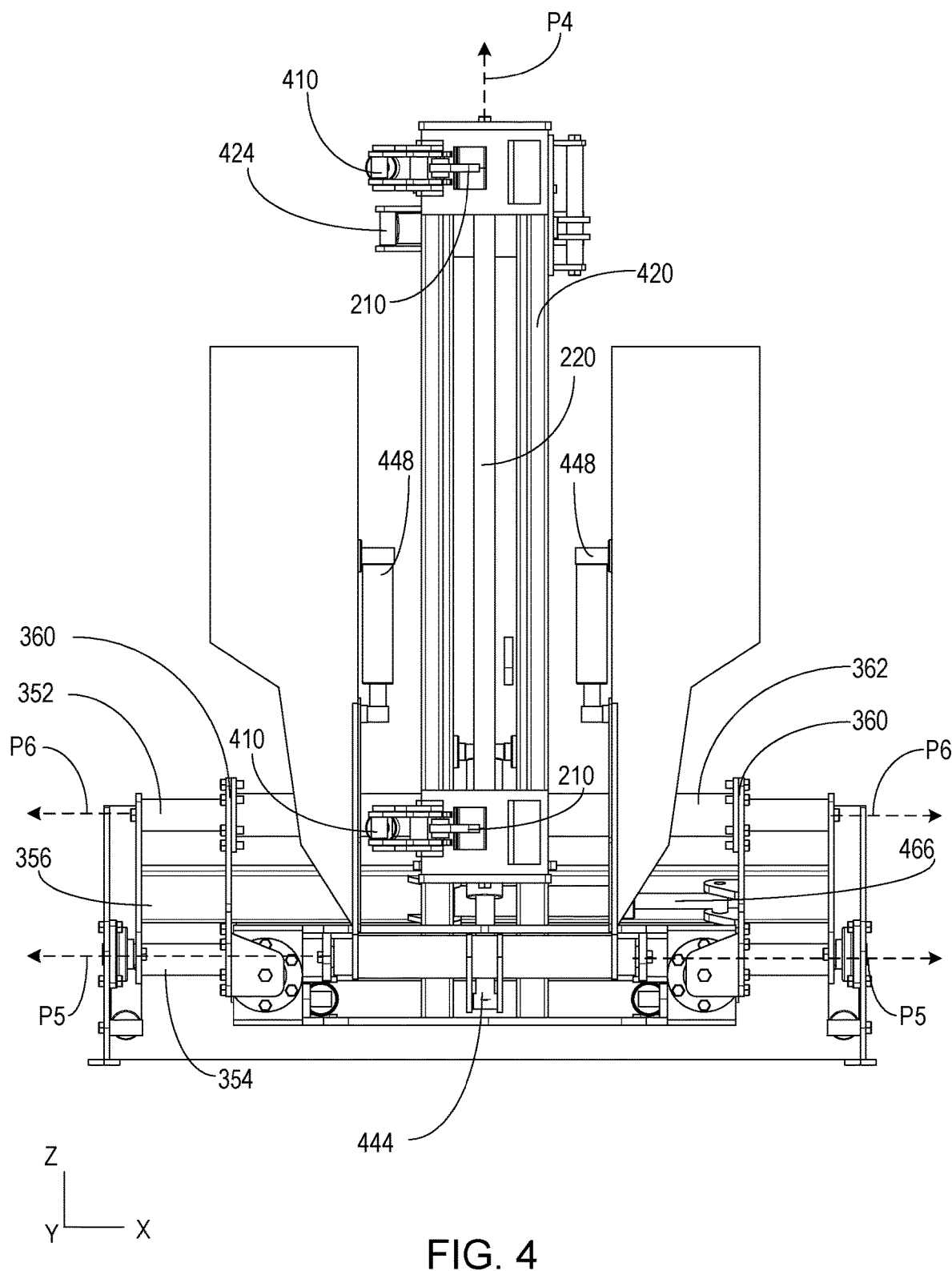
FIG. 4 is a front view of the example post setting attachment.

FIG. 4 illustrates a front view of the post setting attachment 200. As previously described, the post setting attachment can have clamps 210 that are coupled to the column 220 extending from the platform 230. Furthermore, each of the clamps 210 can include a clamp actuator 410 that can open and close the corresponding clamp 210. For example, a first end of a given clamp actuator 410 can be coupled to the corresponding clamp 210 and a second end of the given clamp actuator 410 can be coupled to the column 220.

The post setting attachment 200 can further include a mast 420. The mast 420 can extend from the platform 230 and house the column 220. Moreover, a first end of the column 220 can be rotatably coupled to the mast 420 and a second end of the column 220 can be rotatably coupled to the platform 230. The column 220 can further include a column actuator 424 configured to rotate the column 220 about a fourth axis P4 extending from the column 220.

The platform 230 can further house a rotational beam 440. The rotational beam 440 can be rotatably coupled to the platform 230 at a first and second end of the rotational beam 440. Accordingly, the rotational beam 440 can rotate about a fifth axis P5 that extends from the length of the rotational beam 440. The gravel hoppers 240 extending from the platform 230 can be fixably attached to the rotational beam 440. Therefore, the gravel hoppers 240 can also rotate about the fifth axis P5 extending from the rotational beam 440. Moreover, a scoop actuator 444 can be configured to rotate the rotational beam 440 about the fifth axis P5. For example, a first end of the scoop actuator 444 can be coupled to the rotational beam 440 and a second end of the scoop actuator 444 can be coupled to the mast 420. Therefore, the scoop actuator 444 can be actuated rotate the gravel hoppers 240 into a position that allows the gravel hoppers 240 to scoop gravel from the ground (e.g., Earth) or a pile. That is, the gravel hoppers 240 can be in a horizontal position (e.g., parallel to the y-axis) or beyond to scoop gravel. The scoop actuator 444 can be further actuated to rotate the gravel hoppers 240 into another position that allows the gravel hoppers 240 to hold gravel. That is, the gravel hoppers 240 can be in a vertical position (e.g., parallel to the z axis) to hold gravel.

The gravel hoppers 240 can further include gravel actuators 448. The gravel actuators 448 can be actuated to release or hold gravel. For example, a given gravel hopper 240 can include a release mechanism that is configured to hold gravel. Accordingly, the corresponding gravel actuator 448 can cause the release mechanism to discharge gravel, debris, backfill, or materials held by the corresponding gravel hopper 240.

The support beam 356 can also include a support actuator 466. The support actuator 466 can have a first end that is coupled to the support beam 356. Further, the support actuator 466 can have a second end that is coupled to one of the platform flanges 360. Because the platform flanges 360 can be secured together via a pipe(s) 362, actuation of the support actuator 466 can cause the platform flanges 360 to translate along the first translational beam 352 and the second translational beam 354. That is, the platform flanges 360 can translate along a sixth axis P6 extending from one or both of the first translational beam 352 and second translational beam 354. Accordingly, a post grasped by the clamps 210 can be rotated about an axis parallel to the x, y, or z-axis. Furthermore, the post grasped by the clamps 210 can be translated along an axis parallel to the x or y axis. Because a post grasped by the clamps 210 can be translated along the sixth axis P6 and the third axis P3 of FIG. 3, the post grasped by the clamps can be translated along a horizontal plane defined by the sixth axis P6 and third axis P3.

Figure 5:
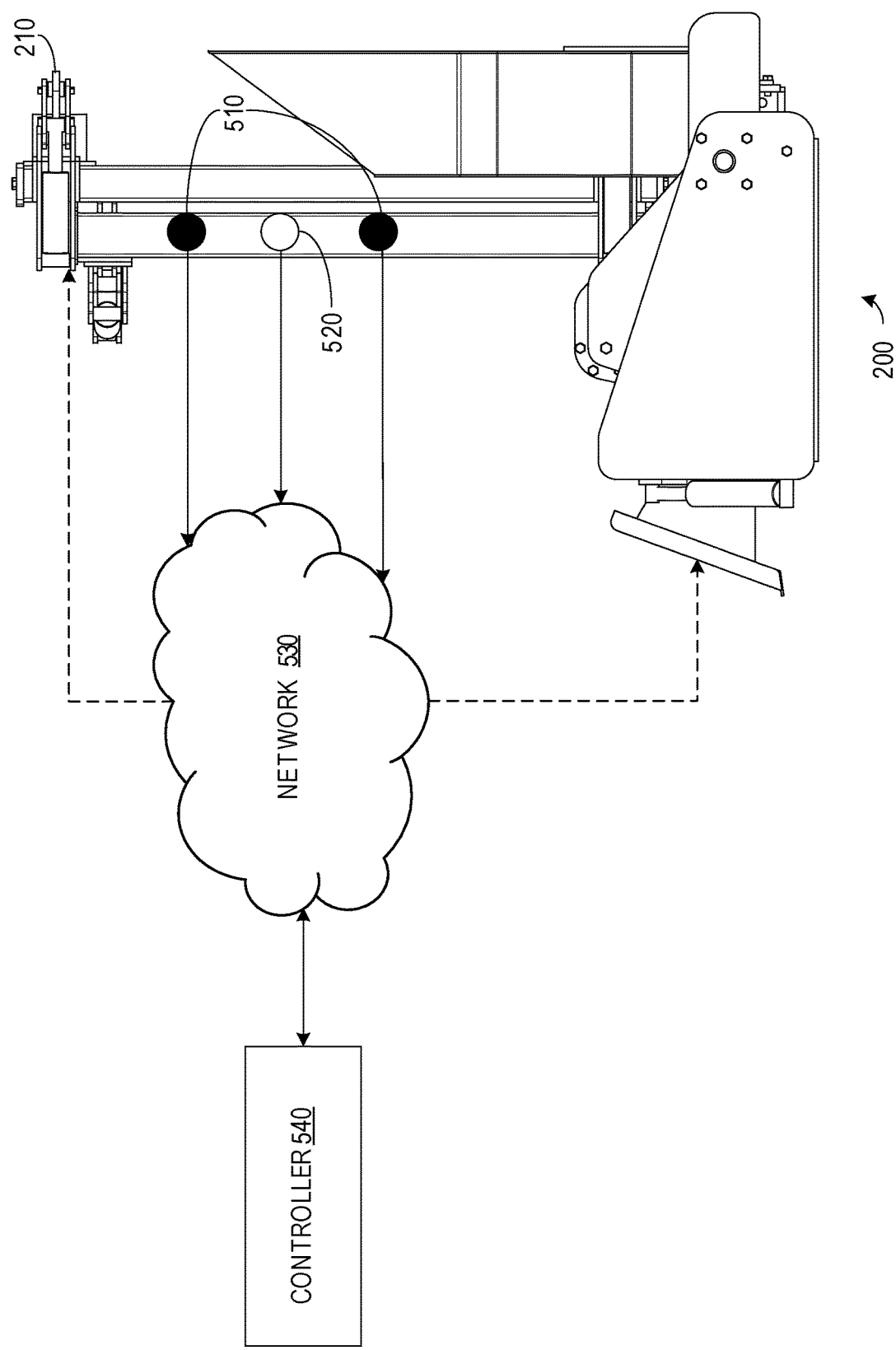
FIG. 5 illustrates sensors and a controller of the post setting attachment.

FIG. 5 illustrates another example of the post setting attachment 200. The post setting attachment 200 can further include a plurality of sensors. The sensors communicate with the controller and enable the system to determine the position of the post both individually and with respect to other posts of a structure. Some sensors that can determine an object's location or displacement can include potentiometer, encoder, inductive sensors, capacitive sensors, and/or laser sensors. A potentiometer is a resistive sensor that has a resistance that varies based on the position of a sliding contact. Linear or rotary potentiometers can measure linear or angular displacement. Similarly, encoders, such as rotary and linear encoders use optical or capacitive methods to measure changes in position. A capacitive sensor can measure changes in capacitance that occurs due to variation in the distance between two conductive plates, such as in a gyroscope or accelerometer. Laser sensors use a laser beam and a detector to measure the position and/or distance to the object.

The plurality of sensors can include one or more inertial measurement unit (IMU) sensors 510 and one or more global positioning system (GPS) sensors 520. An IMU sensor 510 can include an accelerometer to measure triaxial acceleration and a gyroscope to measure triaxial angular velocity. Accordingly, an IMU sensor 510 can integrate motion sensors, such as an accelerometer and gyroscope to gather positional information. A GPS sensor 520 can be a GPS receiver that communicates with a network of GPS satellites to determine the GPS sensor's position. A GPS sensor 520 can establish the location of the GPS sensor 520, and the accuracy of the location may be improved through the use of ground based GPS augmentations systems. The IMU sensors 510 can alternatively be other positional sensors capable of measuring a triaxial position of a post grasped by the post setting attachment. That is, the plurality of sensors positioned on the post setting attachment and coupled to the controller can include LiDAR and other laser based sensors to measure a position of a given post and a position between posts.

For example, LiDAR can be used to create a three-dimensional (3D) point cloud representation of an environment that can include a plurality of posts. LiDAR sensors attached to post setting attachment can include Solid-state LiDAR, Mobile LiDAR, or Flash LiDAR. In other examples, a laser rangefinder can be attached to the post setting attachment to emit a laser pulse towards a target and calculate position based on a phase shift in a received laser pulse. Two or more laser beams can be employed with an Interferometer to measure displacement, distance, or changes in position with higher accuracy relative to a laser rangefinder. In some embodiments, the sensors may be positioned on one or more of the posts already positioned enabling measurements relative to such posts.

In an example, the IMU sensors 510 can be positioned on the column (e.g., column 220 of FIG. 2) of the post setting attachment 200. Therefore, the IMU sensors 510 can determine a triaxial position of the column, as well as a triaxial velocity and acceleration of the column. Because the clamps 210 of the post setting attachment 200 are attached to the column, the position of a post grasped by the clamps 210 can be determine by IMU sensors 510 positioned on the column 220. In some examples, the IMU sensors 510 can be positioned on the clamps 210. In other examples, the IMU sensors 510 can be positioned directly on a post grasped by the clamps 210. Furthermore, the GPS sensor 520 can be positioned on the column to measure a geospatial position of the post setting attachment 200, as well as a geospatial position of a post grasped by the clamps 210. In other examples, the plurality of sensors can include laser based sensors, or the laser based sensors can replace the IMU sensors 510 and GPS sensors 520 to determine a triaxial and geospatial position of the post.

The sensors can further communicate measurements to a controller 530. In an example, the IMU sensors 510 and GPS sensor 520 can provide measurements to the controller 530 over a network 540. The network 540 can be a local area network (LAN), a personal area network (PAN), or other short-range communication standard for exchanging data over short distances, such as Bluetooth®. The network 540 can further be implemented as a cellular network, such as a 3G network, a 4G Long-Term Evolution (LTE) network, a 5G network, etc. Accordingly, the microcontroller 530, IMU sensors 510, and GPS sensor 520 can be equipped with appropriate network interfaces to communicate over the implementation of the network 540. Alternatively, the IMU sensors 510 and GPS sensor 520 can be physically coupled to the controller 530 via a cable or wire. Moreover, the controller can be positioned within a cabin of a skid loader attached to the post setting attachment 200, such as the cabin 150 of the skid loader 100 in FIG. 1.

Similar to the IMU sensors 510 and GPS sensor 520, the controller 530 can communicate with actuators of the post setting attachment 200. That is, the controller 530 can control a base actuator (e.g., base actuator 328 of FIG. 3), a rotational actuator (e.g., 344 of FIG. 3), a platform actuator (e.g., platform actuator 376 of FIG. 3), clamp actuators (e.g., clamp actuators 410 of FIG. 4), a scoop actuator (e.g., scoop actuator 444 of FIG. 4), gravel hopper actuators (e.g., gravel actuators 448 of FIG. 4), and a support actuator (e.g., support actuator 466 of FIG. 4). Each of the actuators of the post setting attachment 200, as well as the IMU sensors 510 and controller 530 can constitute a leveling system. Accordingly, the controller 530 can control a triaxial position of the post setting attachment 200, as well as a post grasped by the clamps 210, by controlling actuators of the post setting attachment 200. Because the controller 530 can receive measurements from the IMU sensors 510 characterizing a triaxial position of a grasped post, the controller 530 can determine an actual triaxial position of the post. The controller 530 can further store a desired triaxial position of the post and adjust the actual position of the post to match the desired triaxial position of the post.

Figure 6:
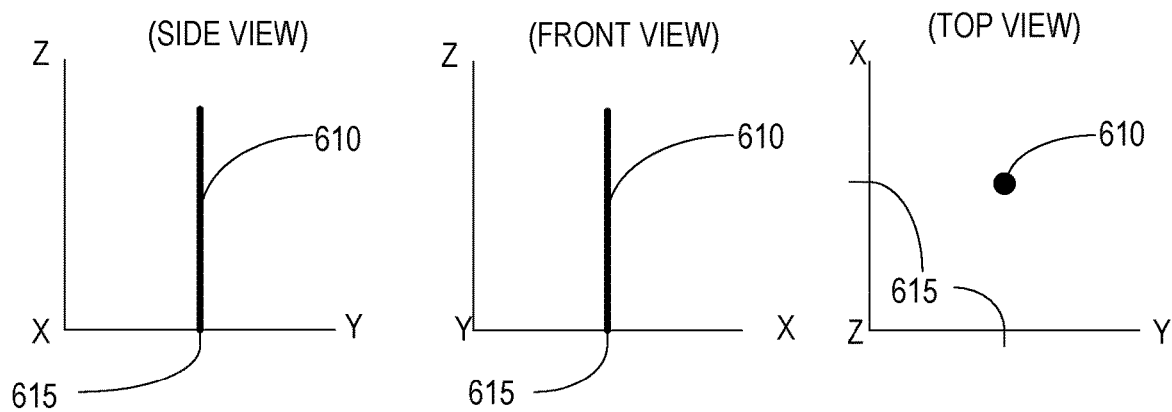
FIG. 6 illustrates example triaxial positions of posts.
Figure 6:
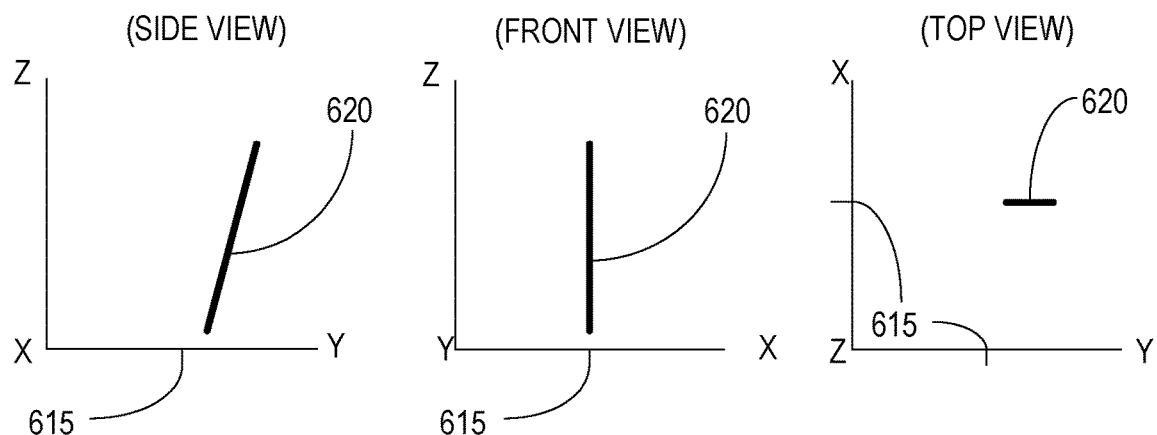
Figure 6:
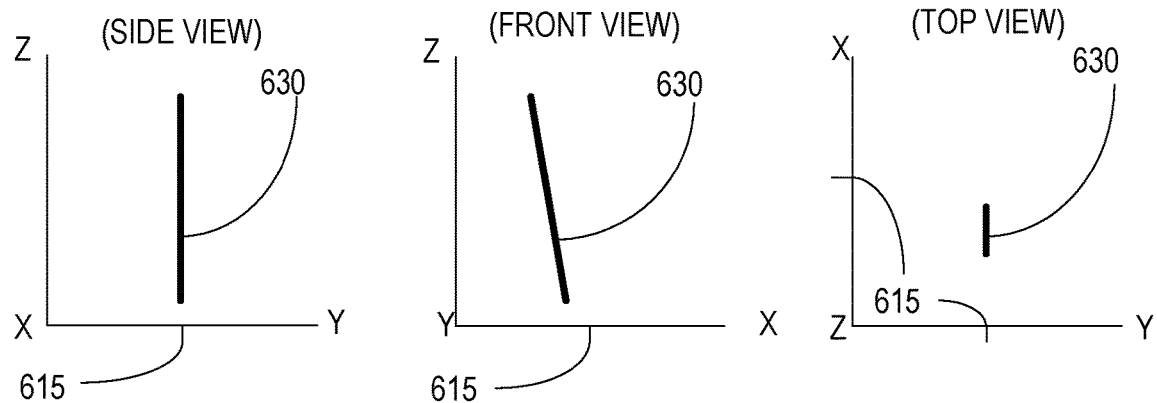

FIG. 6 illustrates example posts in example triaxial positions. A first post 610 can be in a desired triaxial position. That is, the triaxial position of the first post 610 is plumb or vertically aligned. As illustrated in the side view of the first post 610, or facing the x-axis, the first post 610 extends vertically and parallel to the z-axis. Moreover, the first post 610 is perpendicular to the y-axis at an ideal location 615 on the y-axis. Similarly, as illustrated in the front view of the first post 610, or facing the y-axis, the first post 610 extends vertically and parallel to the z-axis. Additionally, the first post 610 is perpendicular to the x-axis at the ideal location 615 on the x-axis. Further, a top view of the first post 610 illustrates the first post 610 aligned at the ideal location 615 on the y and x axis. Accordingly, a controller (e.g., controller 530 of FIG. 5) can store the triaxial position of the first post 610 as a desired triaxial position. Moreover, the controller can determine that the first post 610 is level and aligned, and therefore does not require adjustment via the leveling system.

A second post 620 can require adjustment by the leveling system, such that the actual position of the second post 620 is not level (e.g., plumb) or aligned with the ideal location 615. As illustrated in the side view of the second post 620, the second post 620 slopes up in the y-direction, such that the second post 620 is not plumb or parallel with the z-axis. Additionally, the second post is not perpendicular or centered with the ideal location 615 on the y-axis. Conversely, the second post 620 is plumb and parallel to the z-axis from the front view. Further, the second post 620 is parallel to the z-axis and aligned at the ideal location 615 on the x-axis. Accordingly, the top view of the second post 620 further shows the second post 620 extending along the y-axis, consistent with the slope illustrated in the side view of the second post 620. Further, the second post 620 is aligned with the ideal location on the x-axis, but the second post 620 is unaligned with the ideal location 615 on the y-axis.

The controller can determine the axial triaxial position of the second post 620 with measurements received from IMU sensors (e.g., IMU sensors 510 of FIG. 5) positioned on the post setting attachment (e.g., post setting attachment 200 of FIG. 2). In response to determining the actual triaxial position of the second post 620, the controller can compare the determined actual triaxial position of the second post 620 to the desired position. Therefore, the controller can determine how to adjust the actual triaxial position of the second post 620 to match the desired position, such as the position of the first post 610.

To adjust the position of the second post 620 to the desired position of the first post 610, the controller can control the leveling system to rotate the second post 620 about the x-axis or an axis parallel to the x-axis. For example, the controller can actuate a rotational actuator (e.g., rotational actuator 344 of FIG. 3) of the post setting attachment to rotate the second post about an axis parallel to the x-axis, such the second axis (e.g., P2 of FIG. 3). Therefore, the controller can adjust the position of the second post 620 so that the second post 620 is plumb or parallel to the z-axis, as well as perpendicular to the y-axis.

Further, the controller can translate the second post 620 along the y-axis to move the second post to the ideal location 615 along the y-axis. For example, the controller can actuate platform actuators (e.g., platform actuators 376 of FIG. 3) of the post setting attachment translate the second post 620 along the y-axis until the second post 620 is located at the ideal location 615 along the y-axis. Accordingly, the controller can adjust the actual triaxial position of the second post 620 to match the stored desired triaxial position, such as the triaxial position of the first post 610.

A third post 630 can also have a triaxial position that requires adjustment by the leveling system, such that the actual triaxial position of the third post 630 is not level (e.g., plumb) or aligned with the ideal location 615. As illustrated in the side view of the third post 630, the third post 630 is plumb and parallel to the z-axis and perpendicular to the y-axis at the ideal location 615. However, the third post 630 slopes down along x-axis and is unaligned with the ideal location 615 on the x-axis, as illustrated in the front view of the third post 630. Accordingly, the top view of the third post 630 further shows the third post 630 extending along and perpendicular to the y-axis at the ideal location 615, consistent with the side view of the third post 630. The top view of the third post 630 further illustrates that the third post 630 is unaligned with the ideal location 615 on the x-axis and extends along the x-axis.

Again, the controller can determine the axial triaxial position of the third post 630 with measurements received from IMU sensors positioned on the post setting attachment. In response to determining the actual triaxial position of the third post 630, the controller can compare the determined actual triaxial position of the third post 630 to the desired position. Therefore, the controller can determine how to adjust the actual triaxial position of the third post 630 to match the desired position, such as the position of the first post 610.

To adjust the position of the third post 630 to the desired position of the first post 610, the controller can control the leveling system to rotate the third post 630 about the y-axis or an axis parallel to the y-axis. For example, the controller can actuate a base actuator (e.g., base actuator 328 of FIG. 3) of the post setting attachment to rotate the third post 630 about an axis parallel to the 7-axis, such the first axis (e.g., first axis P1 of FIG. 3). Therefore, the controller can adjust the position of the third post 630 so that the third post 630 is plumb or parallel to the z-axis, as well as perpendicular to the x-axis.

Further, the controller can translate the third post 630 along the y-axis to move the third post 630 to the ideal location 615 along the x-axis. For example, the controller can actuate support actuators (e.g., support actuator 466 of FIG. 4) of the post setting attachment to translate the third post 630 along the x-axis until the third post 630 is located at the ideal location 615 along the x-axis. Accordingly, the controller can adjust the actual triaxial position of the third post 630 to match the stored desired triaxial position, such as the triaxial position of the first post 610.

Figure 7:
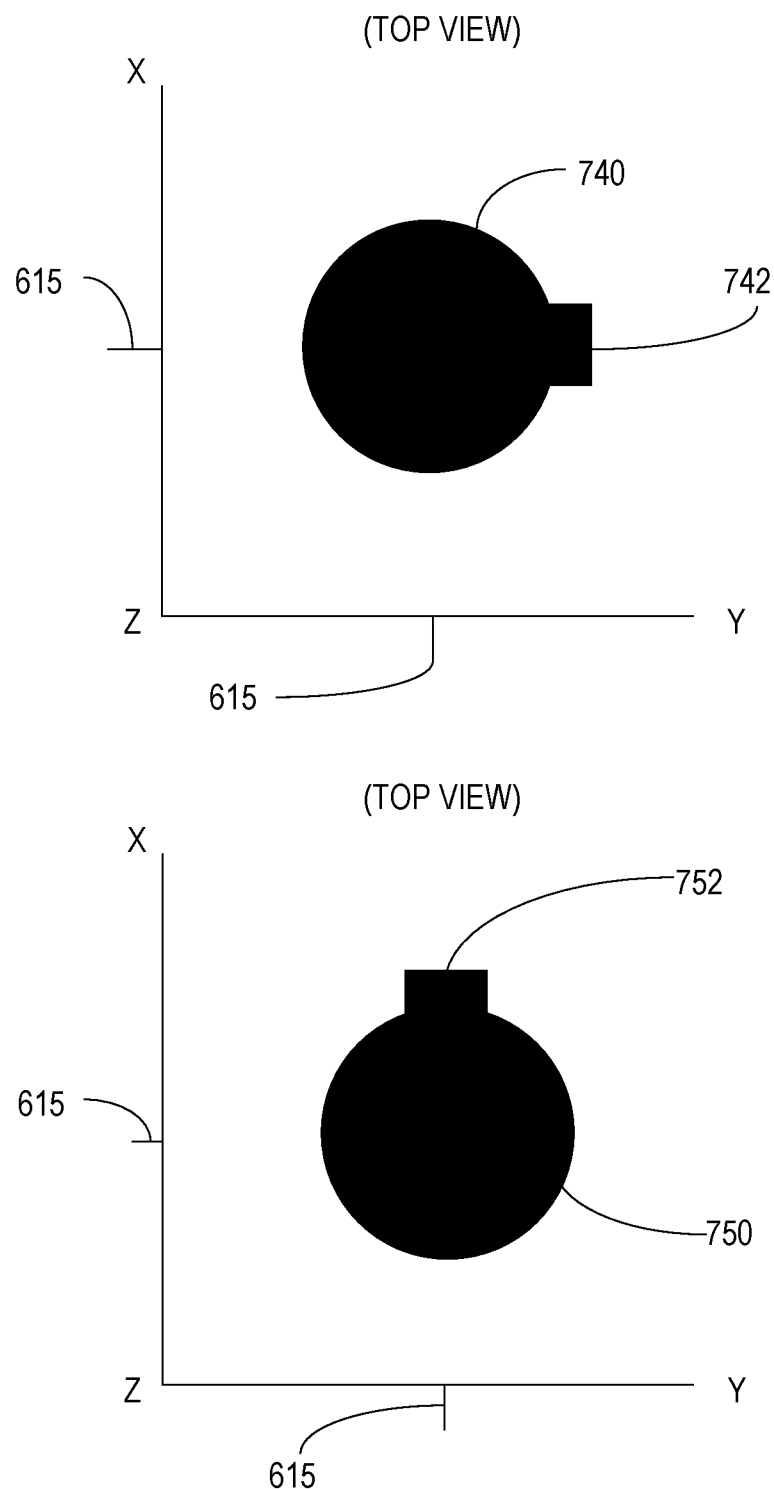
FIG. 7 illustrates additional example triaxial positions of posts.

FIG. 7 illustrates additional example posts in example triaxial positions. A fourth post 740 can have a triaxially desired position. That is, the fourth post 740 can be plumb or parallel to a vertical z-axis. Additionally, the triaxial position of the fourth post 740 can be perpendicular to an ideal location 615 on the x and y-axis. Moreover, the fourth post 740 can include a fastener 742 that extends from a side of the fourth post 740. The fastener 742 can be configured to install fencing, wire, or other equipment to be fastened to the fourth post 740. Accordingly, the position of the fastener 742 can alter a desired position for the fourth post 740. For example, the desired triaxial position of the fourth post 740 can require that the fastener 742 faces a desired direction, such that the fastener 742 extends toward the y-axis and away from the x-axis. Therefore, the fourth post 740 is in a desired triaxial position because the fourth post 740 is plumb, at the ideal location 615, and the fastener 742 of the fourth post 740 is facing the desired direction.

The desired direction of a post can be stored with the desired triaxial position by the controller. Accordingly, the controller can receive measurements from the plurality of sensors or user input that indicates the direction of the fifth post 750. As illustrated in FIG. 7, the fifth post 750 is plumb and perpendicular to at the ideal location 615 on the x and y-axis. However, the fifth post includes a fastener 752 that extends towards the x-axis and away from the y-axis. That is, the fifth post 750 faces a direction perpendicular the desired direction stored by the controller. Accordingly, the controller can determine the actual triaxial position of the fifth post 750 and compare the actual triaxial position of the fifth post 750 to the desired triaxial position, including the desired direction. In response, the controller can control an actuator (e.g., column actuator 424 of FIG. 4) that rotates the fifth post 750 about or parallel to the z-axis, such as the fourth axis P5 extending through the column (e.g., column 220 of FIG. 2). In some examples, the fifth post 750 can be rotated about an axis extending from the fifth post 750 and parallel to the z-axis.

Furthermore, the controller can rotate a given post grasped by the post setting attachment about an axis parallel to the x-axis, y-axis, and z-axis. Therefore, the leveling system of the post setting attachment provides capability in each direction for the controller to ensure that the given post is plumb and properly aligned. Additionally, the controller can store desired triaxial positions of individual posts for a plurality of posts. Accordingly, the controller can store a blueprint, or desired positions for a plurality of posts.

Figure 8:
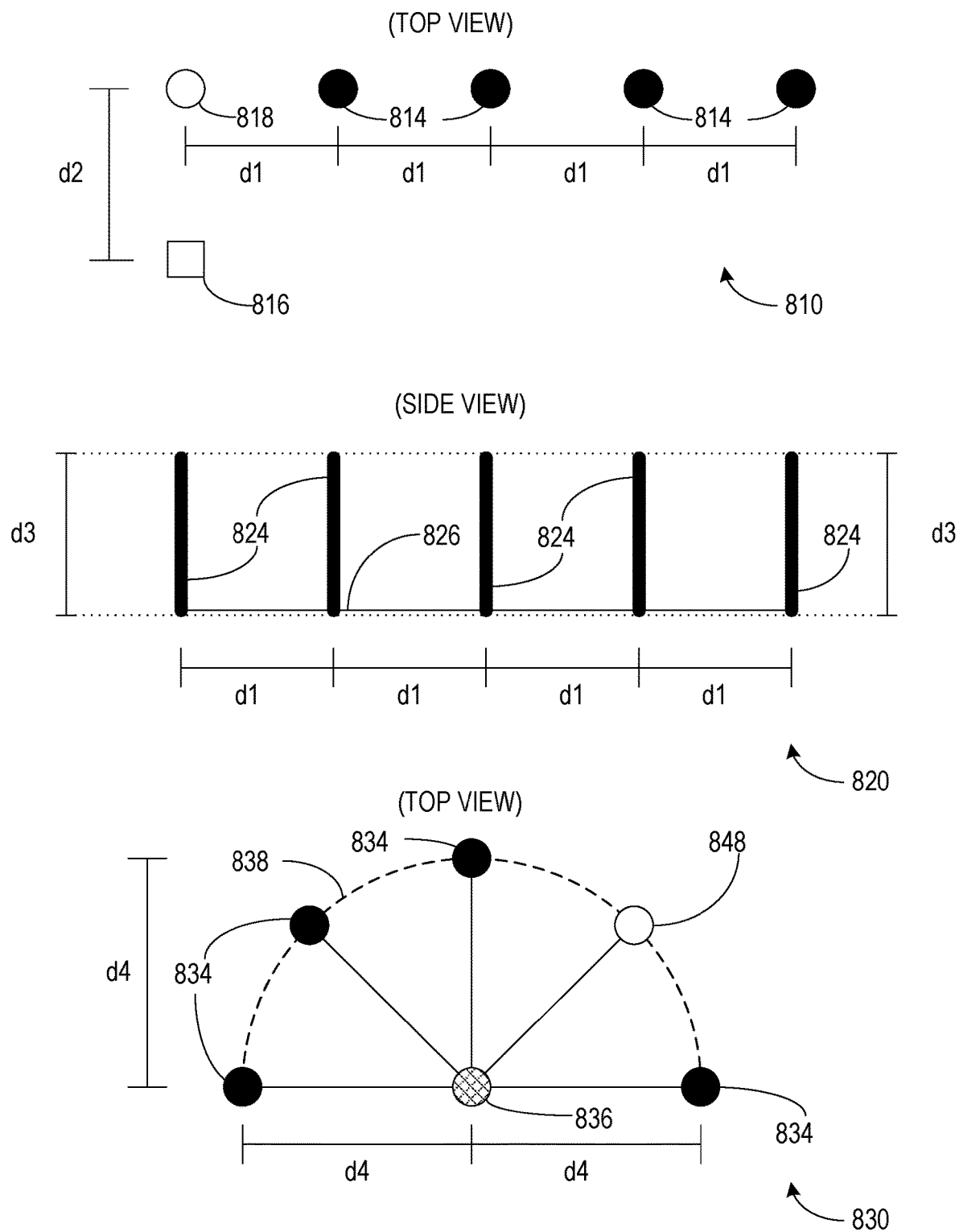
FIG. 8 illustrates example blueprints of a plurality of posts.

FIG. 8 illustrates example blueprints for a plurality of posts. A plurality of posts can include posts that have similar attributes such length, width, height, material, and form. Alternatively, the plurality of posts can include posts that have different attributes. A first blueprint 810 illustrates a plurality of posts from a top view. Secured posts 814 are posts that have been secured to the ground, Earth, or flooring according to the first blueprint 810 and are illustrated as black dots. The first blueprint 810 can be stored in a controller and indicate a desired triaxial position of each post. Therefore, the secured posts 814 can be plumb and each face the same direction according to the first blueprint 810.

The first blueprint 810 can also specify a first distance d1 that laterally separates each post of the first blueprint 810 from a neighboring secured post 814. Additionally, the first blueprint 810 can indicate that the secured posts 814 are positioned sequentially and lateral to each of the other secured posts 814, such that the secured posts 814 form a straight line. Therefore, a blueprint, such as the first blueprint 810, stores a desired position of each post that includes both a triaxial position and a geospatial position that is related to the triaxial and geospatial positions of other posts in the blueprint. That is, the blueprint can indicate a desired geospatial and triaxial position of a given post with respect to an adjacent post.

A controller can employ a stored blueprint to level and align a post according to a position of other posts in the stored blueprint. For example, a new post 816, illustrated as a square, can be installed by a post setting attachment according to the first blueprint 810 at a desired geospatial position 818. Accordingly, the controller of the post setting attachment can determine the desired geospatial position 818 of the new post 816 according to the first blueprint 810. Moreover, the post setting attachment can grasp the new post 816 and receive an actual geospatial position of the post setting attachment and/or the new post from a GPS sensor positioned on the post setting attachment. Therefore, the controller can compare the actual geospatial position of the new post 816 with the desired geospatial position 818 of the new post 816.

As illustrated in the first blueprint 810, the new post 816 can have an actual geospatial position that is a second distance d2 from the desired geospatial position 818 and in a direction that is perpendicular to the line formed by the secured posts 814. Accordingly, the controller can further determine a route to place the new post 816 at the desired geospatial position 818. For example, the controller can control a skid loader attached to the post setting attachment to move the post to desired geospatial position 818. That is, the controller can actuate tracks of the skid loader to move the post setting attachment towards the desired geospatial position 818. Therefore, the controller can actuate the skid loader to move the post setting attachment and new post 816 to the desired geospatial position 818.

Additionally, the controller can control the post setting attachment to set each of the secured posts 814. Thus, the controller can store a geospatial position of each of the secured posts 814 received from the GPS sensor while setting each respective secured post 814. Therefore, the controller can also compare the actual geospatial position of the new post 816 with the geospatial positions of the secured posts 814. Therefore, the controller can determine the desired geospatial position 818 of the new post 816 based on the first blueprint 810 as well as the geospatial positions of each of the secured posts 814.

A second blueprint 820 illustrates a plurality of secured posts 824 from a side view. The plurality of secured posts 824 can be the plurality of secured posts 814 of the first blueprint 810. Similar to the first blueprint 810, the plurality of secured posts 824 of the second blueprint 824 are separated by a first distance d1. Additionally, each of the secured posts 824 are plumb or vertically aligned according to the second blueprint 820. Additionally, a blueprint, such as the second blueprint 820, can specify a third distance d3 that is the length of the secured post from a surface 826 that the secured post is set, such as the Earth or ground. The controller can further control arms of the skid loader attached to the post setting attachment to raise and lower a post to secure the post to the surface 826 and ensure that the secured post 824 has an actual geospatial position that matches a desired geospatial position of the second blueprint 820.

In some examples, the length of the secured post 824 from the surface can be included in the second blueprint 820 as a stored desired triaxial position, such as the triaxial position of the first post 610 of FIG. 6. The controller can determine actual length of a post to be secured from measurements provided by the IMU sensors and/or GPS sensors, as well as Light Detection and Ranging (LiDAR) sensors. That is, the plurality of sensors positioned on the post setting attachment and coupled to the controller can include LiDAR and other laser based sensors to measure a position of a given post and a position between posts. Accordingly, the controller can employ the LiDAR sensors and other laser based sensors to determine an actual position of each post of a plurality of posts to determine the desired geospatial and triaxial position of a new post, such as new post 816.

Additionally, a blueprint stored by a controller can include various layouts for a plurality of posts. A third blueprint 830 illustrates a top view of a plurality of secured posts 834 that are each spaced a fourth distance d4 from a centerpoint 836. That is, the centerpoint 836 can define the center of a circle with a circumference 838. Accordingly, the third blueprint 830 can provide that each of the secured posts 834 are geospatially positioned along the circumference 838 of the circle formed from the centerpoint 836. Therefore, the fourth distance d4 can be a radial distance from the centerpoint 836, such that each of the secured posts 834 are separated from the centerpoint 836 by the fourth distance d4. Moreover, each of the secured posts 834 can be equally distant from each other along the circumference of the circle defined by the centerpoint 836, similar to the plurality of secured posts 824 equally distanced in the second blueprint 820.

The controller can further store third blueprint 830 and determine a desired geospatial position 848 based on the third blueprint. Again, the post setting attachment can grasp a new post, such as the new post 816 of the first blueprint 810 and determine an actual geospatial location of the new post. Therefore, the controller can compare the actual geospatial position of the post setting attachment and/or the new post to the desired geospatial position 848. Accordingly, the controller can control the skid loader attached to the post setting attachment, as well as the post setting attachment, to secure the new post at the desired geospatial location 848.

As previously stated, the controller can control a skid loader attached to the post setting attachment to move a grasped post to a desired geospatial position, such as the desired geospatial position 848 of the third blueprint 830. That is, the controller can control the tracks and arms of the skid loader to move the grasped post to the desired geospatial position. The controller can move the skid loader and attached post setting attachment based on a stored blueprint for the grasped post, as well as the positions of other posts. Further, the controller can control skid loader arms, skid loader tracks, platform actuators, and support actuator to match the actual geospatial position of the grasped post to the desired geospatial position.

The controller, skid loader arms, skid loader tracks, platform actuators, and support actuator can constitute an alignment system that is employed to adjust a geospatial position of a grasped post. That is, the alignment system can translate and move a grasped post based on geospatial positions of other posts and/or a blueprint stored in the controller. Moreover, the alignment system can perform coarse tuning of a position of a given post. That is, the alignment system can move the given post over a area that exceeds a threshold distance (e.g., over 1 meter) from the desired geospatial position to properly align the given post with other posts, such that the actual geospatial position of the given post is aligned with the desired geospatial position of the given post.

As previously stated, the leveling system can include the base actuator, the rotational actuator, the column actuator, and the controller. Therefore, the leveling system can ensure that the given post is plumb. Moreover, the leveling system can perform fine tuning of the position of the given post. That is, the leveling system can adjust alignment of the given post when the actual geospatial position of the given post is within a threshold distance (e.g., within 1 meter) of the desired geospatial position. Fine tuning can include adjusting the actual triaxial position of the given post to match a desired triaxial position of the post stored in a blueprint of the microcontroller. Additionally, the leveling system can include the each actuator of the post setting attachment to adjust the triaxial position of the given post.

Figure 9:
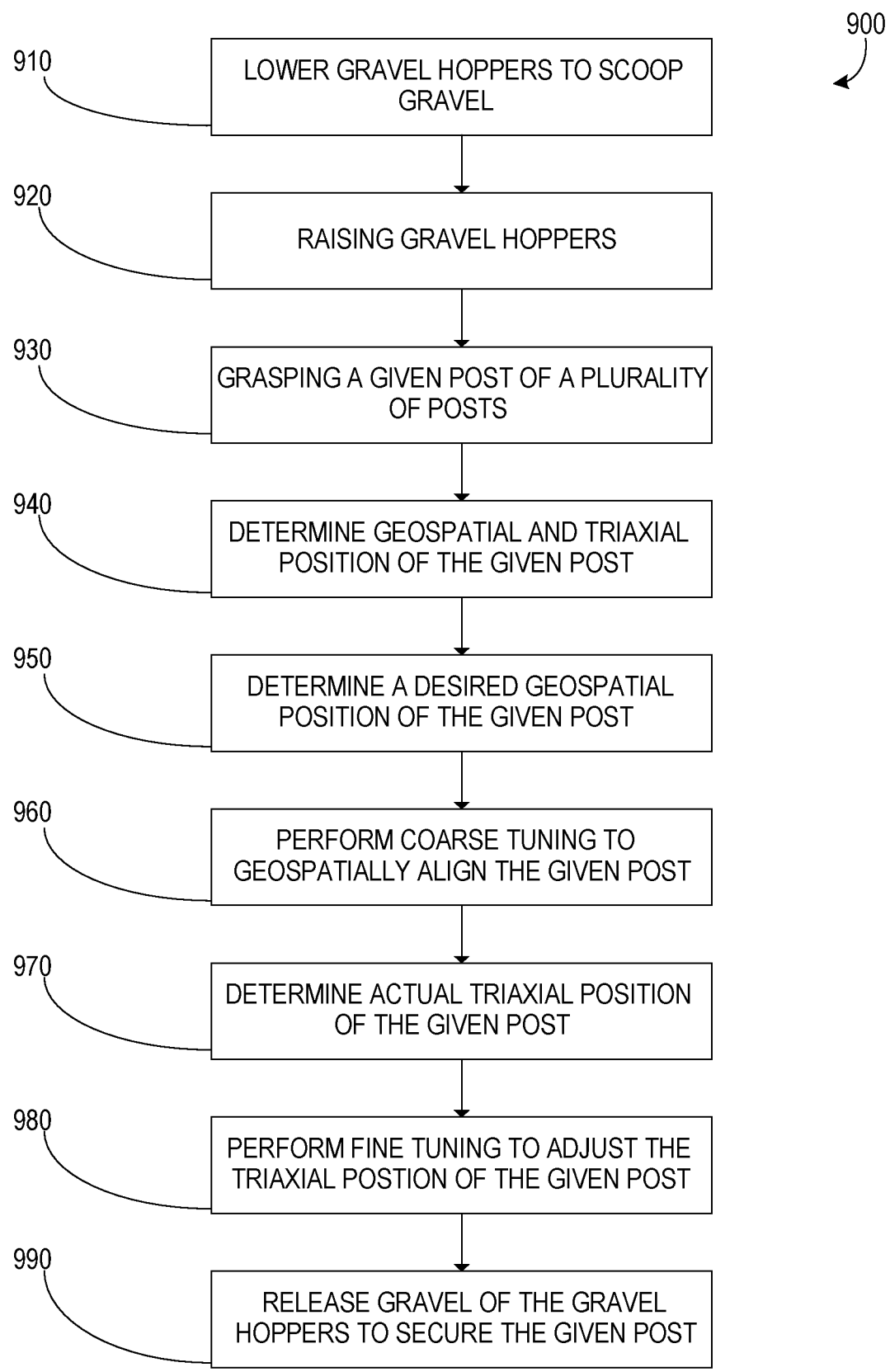
FIG. 9 illustrates an example method for setting a post with the post setting attachment.

FIG. 9 illustrates an example flowchart of a method 900 for setting a given post with a post setting attachment attached to a skid loader. At 910, gravel hoppers 240 of the post setting attachment 200 can be lowered to scoop gravel. For example, a scoop actuator 444 can be actuated by a controller 530 to rotate the gravel hoppers 240 into a lowered position. The controller 530 can further move the post setting attachment 200 by actuating tracks 130 of the skid loader 100 to scoop gravel or Earth with the gravel hoppers 240. At 920, the gravel hoppers 240 can be raised in response to the controller 530 actuating the scoop actuator 444 to rotate the gravel hoppers 240 into a vertical position.

At 930, clamps 210 of the post setting attachment 200 can grasp a given post, such as the second post 620 or the third post 630, of a plurality of posts, such as the secured posts 814 of the first blueprint 810. At 940, the controller can receive measurements from a plurality of sensors attached to the post setting attachment 200, such as the IMU sensors 510 and GPS sensor 520 to determine a geospatial and triaxial position of the given post. At 950, the controller 530 can determine a desired geospatial position, such as desired geospatial position 818 of the first blueprint 810, based on a blueprint stored by the controller and geospatial positions of the plurality of posts.

At 960, the controller 530 can control the alignment system to perform coarse tuning, or move the given post from the actual geospatial position of the post to the desired geospatial position of the post. At 970, the controller 530 can determine an actual triaxial position of the given post, such as the triaxial position of the second post 620, third post 630, or fifth post 750. At 980, the controller 530 can perform fine tuning, or adjusting the actual triaxial position of the given post to match a desired triaxial position of the given post stored by the controller, such as the triaxial position of the first post 610. At 990, when the given post is in a desired geospatial and triaxial position, the controller 530 can actuate a gravel actuator 448 to release the gravel of the gravel hoppers to secure the given post in the desired geospatial and triaxial positions.

One or more illustrative embodiments incorporating aspects of the invention are disclosed herein. Not all features of a physical implementation are described or shown in this application for the sake of clarity. It is understood that in the development of a physical embodiment incorporating the embodiments of the present invention, numerous implementation-specific decisions are to be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A post setting attachment for a utility vehicle comprising:
   a base having a first side mountable to the utility vehicle, the base having a second side opposing the first side of the base;
   a column with a length extending vertically and coupled to the second side of the base;
   a pair of clamps configured to grasp a post, the pair of clamps being attached at separate lengths along the column such that the pair of clamps are spaced apart from each other along the column;
   a controller that rotates and translates the column to adjust a position of the post; and
   a gravel hopper coupled to the second side of the base that is controlled by the controller, such that the gravel hopper discharges gravel after the controller adjusts the position of the post to secure the post in position.

2. The post setting attachment of claim 1, further comprising a plurality of sensors including at least one positional sensor for measuring an actual triaxial position of the post and a global positioning sensor (GPS) to measure an actual geospatial position of the post.

3. The post setting attachment of claim 2, further comprising:
   an alignment system controlled by the controller, the alignment system configured to adjust the actual triaxial position and the actual geospatial position of the post.

4. The post setting attachment of claim 3, wherein the controller stores a desired position of the post, the desired position of the post including a desired triaxial position of the post and a desired geospatial position of the post.

5. The post setting attachment of claim 4, wherein the controller compares the actual triaxial position of the post to the desired triaxial position of the post and controls the alignment system to adjust the actual triaxial position of the post to match the desired triaxial position of the post.

6. The post setting attachment of claim 5, wherein the alignment system includes actuators to rotate the column and the post about a horizontal axis perpendicular to the column, and to rotate the column and post about a vertical axis extending from the column.

7. The post setting attachment of claim 6, wherein the controller compares the actual geospatial position of the post to the desired geospatial position of the post and controls the alignment system to adjust the actual geospatial position of the post to match the desired geospatial position of the post.

8. The post setting attachment of claim 7, wherein the alignment system includes actuators to translate the column and post along a horizontal plane perpendicular to the column.

9. The post setting attachment of claim 8, wherein the post is a given post of a plurality of posts, and the controller is configured to store a blueprint that includes a desired position of the plurality of posts.

10. The post setting attachment of claim 9, wherein the controller compares the actual position of the given post with the actual position of an adjacent post of the plurality of posts to determine the desired position of the given post, the actual position of the adjacent post being stored by the controller in response to setting the adjacent post.

11. The post setting attachment of claim 10, wherein the alignment system further includes arms of the utility vehicle to translate the column and post along the vertical axis extending from the column, and tracks of the utility vehicle to translate the column and post along the horizontal axis perpendicular to the column.

12. The post setting attachment of claim 1, wherein each of the pair of clamps are adjustable along the length of the column.

13. A method for setting a post with an attachment for a utility vehicle, comprising:
   grasping, via a pair of actuated clamps coupled to the attachment, a post;
   measuring, via a plurality of sensors coupled to the attachment, an actual position of the post including an actual triaxial position of the post and an actual geospatial position of the post;
   comparing, via a controller, the actual position of the post with a desired position of the post stored by the controller in response to receiving the measured actual position of the post from the plurality of sensors, wherein the desired position of the post includes a desired geospatial position and a desired triaxial position;
   adjusting, via an alignment system controlled by the controller, the actual geospatial position of the post to match the desired geospatial position of the post stored by the controller;
   adjusting, via a leveling system controlled by the controller, the actual triaxial position of the post to match the desired triaxial position of the post stored by the controller;
   discharging, via a gravel hopper controller by the controller, backfill material to secure the post in response to the controller determining that the actual position of the post matches the desired position of the post; and
   releasing, via the actuated clamps, the post in response to the controller discharging the backfill material.

14. The method of claim 13, wherein the post is a given post of a plurality of posts, and the controller is configured to determine the desired position of the given post based on an actual position of an adjacent post of the plurality of posts.

15. The method of claim 13, wherein the post is a given post of a plurality of posts, and the controller is configured to store a blueprint that includes a desired position of each post of the plurality of posts.

16. The method of claim 15, further comprising:
   rotating, by the leveling system, the given post about a horizontal axis or a vertical axis;
   translating, by the alignment system, the given post along a horizontal plane.

17. The method of claim 16, further comprising:
   rotating, via a scoop actuator coupled to the gravel hopper and controlled by the controller, the gravel hopper into a horizontal position to scoop backfill material; and
   rotating, via the scoop actuator, the gravel hopper into a vertical position in response to filling the gravel hopper with backfill material.

18. A post setting attachment for a skid loader comprising:
   a base having a first side mountable to arms of the skid loader, the base having a second side opposing the first side of the base;
   a platform rotatably coupled to the second side of the base;
   a column with a length extending vertically from the platform, the column being rotatably coupled to the platform;

a pair of clamps configured to grasp a given post of a plurality of posts, the pair of clamps being attached at separate lengths along the column;

a plurality of sensors coupled to the post setting attachment configured to measure an actual position of the given post;

a controller that receives the actual position of the given post from the plurality of sensors and stores a desired position of the given post relative to the plurality of posts;

an alignment system controlled by the controller to adjust the actual position of the given post to match the actual position of the given post with the desired position of the given post; and a gravel hopper extending vertically from the platform and including a gravel hopper actuator that is controlled by the controller, such that the gravel hopper discharges gravel in response to the controller determining the actual position of the given post matches the desired position of the given post.

19. The post setting attachment of claim 18, wherein the gravel hopper is rotatably coupled to the platform and includes a scoop actuator, such that the controller actuates the scoop actuator to rotate the gravel hopper to a lowered position to scoop gravel and rotate the gravel hopper to a vertical position in response to scooping gravel.

20. The post setting attachment of claim 19, wherein the plurality of sensors further comprises:

an inertial measurement unit (IMU) sensor configured to measure an actual triaxial position of the given post; and a global positioning system (GPS) sensor configured to measure an actual geospatial position of the given post.

21. The post setting attachment of claim 18, wherein the alignment system comprises:

a pair of tracks and the arms of the skid loader configured to translate the post setting attachment and the given post along a horizontal plane;

a plurality of horizontal actuators coupled to the post setting attachment configured to translate the platform and the given post along the horizontal plane;

a base actuator configured to rotate the platform about a horizontal axis perpendicular to the column and parallel to the base; and a rotational actuator configured to rotate the platform about another horizontal axis perpendicular to the column and the base.

* * * * *